(12) United States Patent
Horng et al.

(10) Patent No.: US 8,047,717 B2
(45) Date of Patent: Nov. 1, 2011

(54) BEARING POSITIONING STRUCTURE FOR MOTOR

(75) Inventors: Alex Horng, Kaohsiung (TW); Yu-Yuan Lu, Kaohsiung (TW); Duo-Nien Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 188 days.

(21) Appl. No.: 12/496,429

(22) Filed: Jul. 1, 2009

(65) Prior Publication Data

US 2009/0261672 A1 Oct. 22, 2009

Related U.S. Application Data

(62) Division of application No. 11/590,807, filed on Nov. 1, 2006, now abandoned.

(30) Foreign Application Priority Data

Sep. 6, 2006 (TW) ................................ 95132909 A

(51) Int. Cl.
*F16C 32/06* (2006.01)
(52) U.S. Cl. ......................................... 384/107; 384/100

(58) Field of Classification Search .................. 384/100, 384/107–120, 276, 295; 310/90; 360/99.08, 360/98.07; 417/354, 423.12, 423.13
See application file for complete search history.

(56) References Cited

U.S. PATENT DOCUMENTS

| | | | |
|---|---|---|---|
| 4,955,791 | A | 9/1990 | Wrobel |
| 5,610,462 | A | 3/1997 | Takahashi et al. |
| 6,084,328 | A | 7/2000 | Yamashita et al. |
| 6,307,293 | B1 | 10/2001 | Ichiyama |
| 6,336,745 | B1 | 1/2002 | Horng et al. |
| 6,435,722 | B1 | 8/2002 | Horng |
| 6,756,714 | B2 | 6/2004 | Alex et al. |
| 6,954,017 | B2 | 10/2005 | Takahashi et al. |
| 7,111,988 | B2 | 9/2006 | Chen |
| 7,518,272 | B2 | 4/2009 | Yeh et al. |
| 2006/0181174 | A1 | 8/2006 | Liu |

*Primary Examiner* — Thomas R Hannon
(74) *Attorney, Agent, or Firm* — Muncy, Geissler, Olds & Lowe, PLLC

(57) ABSTRACT

A bearing positioning structure for a motor includes an axial tube and a positioning member. The positioning member includes a pressing portion and a coupling portion. The coupling portion of the positioning member is engaged with a coupling section of the axial tube for securely mounting the positioning member to the axial tube, with the pressing portion of the positioning member pressing against a bearing to position the bearing in the axial tube. In another example, the coupling portion of the positioning member engages with a coupling section on a stator.

7 Claims, 5 Drawing Sheets

BEARING POSITIONING STRUCTURE FOR MOTOR

This application is a Divisional of co-pending application Ser. No. 11/590,807, filed on Nov. 1, 2006, and for which priority is claimed under 35 U.S.C. §120; the entire contents of which are hereby incorporated by reference.

BACKGROUND OF THE INVENTION

1. Field of the Invention

The present invention relates to a positioning structure for a motor and, more particularly, to a bearing positioning structure for a motor with a positioning member providing with a coupling portion and a pressing portion for stably positioning at least one motor component in an axial tube of a base.

2. Description of Related Art

FIG. 1 of the drawings illustrates a conventional bearing positioning structure for a motor 1 comprising a base 11, a stator 12, a supporting member 13, a bearing 14, a positioning member 15, and a rotor 16. The base 11 includes an axial tube 111 for receiving the bearing 14. The stator 12 includes a winding 121. The supporting member 13 is fixed in an end of the axial tube 111 by force-fitting. An abrasion-resisting member 131 is mounted in a lower end of the supporting member 13. A restraining member 132 is placed on top of the supporting member 13 and includes a through-hole (not labeled) for retaining a shaft 161 of the rotor 16. The positioning member 15 is mounted on top of the bearing 14 to prevent the bearing 14 from moving relative to the axial tube 111 of the base 11, thereby assuring reliable assembly.

Still referring to FIG. 1, in assembly, the supporting member 13, the bearing 14, and the positioning member 15 are mounted into the axial tube 111 of the base 11 in sequence, with the supporting member 13 and the positioning member 15 respectively fixed in two ends of the axial tube 111 by force-fitting, thereby positioning the bearing 14 in the axial tube 111. The shaft 161 is rotatably extended through an axial hole (not labeled) formed by a through-hole in each of the bearing 14 and the positioning member 15 and a hole (not labeled) in the supporting member 13.

Still referring to FIG. 1, when the motor 1 turns, since the diameter of the through-hole of the retaining member 132 on top of the supporting member 13 is smaller than an end of the shaft 161 and since the retaining member 132 is engaged in a necked portion (not labeled) of the shaft 161, the rotor 16 is prevented from disengaging from the bearing 14. Further, the bearing 14 is prevented from moving in the axial tube 111, as the positioning member 15 is force-fitted in an end of the axial tube 111 of the base 11, with a bottom of the positioning member 15 pressing against a top of the bearing 14. Hence, the bearing 14 and the shaft 16 are reliably coupled to the base 11.

However, the above conventional bearing positioning structure for a motor has some drawbacks. First, the axial tube 111 easily deforms after a period of time due to heat expansion and cold shrinkage as well as stress generated during operation of the motor such that the supporting member 13 and the positioning member 15 cannot be fixed in the axial tube 111, leading to unreliable positioning of the bearing 14. Namely, the bearing 14 is liable to move in the axial tube 111, shortening the life of the motor 1. Improvement in the bearing positioning structure for a motor is thus required.

OBJECTS OF THE INVENTION

An object of the present invention is to provide a bearing positioning structure for a motor with improved assembling reliability.

Another object of the present invention is to provide a bearing positioning structure for promoting the assembling reliability and prolonging the life of the motor.

A further object of the present invention is to provide a bearing positioning structure for a motor with improved effect in preventing entrance of dusts into the motor, thereby prolonging the life of the motor.

SUMMARY OF THE INVENTION

In accordance with an aspect of the present invention, a bearing positioning structure for a motor comprises an axial tube and a positioning member. The axial tube receives a bearing and includes a coupling section. The positioning member includes a pressing portion and a coupling portion. The coupling portion of the positioning member is engaged with the coupling section of the axial tube for securely mounting the positioning member to the axial tube, with the pressing portion of the positioning member pressing against the bearing to position the bearing in the axial tube.

Preferably, the coupling portion is formed on a bottom of the positioning member.

Preferably, the positioning member includes a top portion, and the pressing portion extends axially from an underside of the top portion.

Preferably, the coupling portion of the positioning member is a hook or an engaging groove.

Preferably, a restraining member is mounted in the axial tube for limiting axial movement of a shaft of a rotor.

Preferably, the coupling section of the axial tube is a flange.

Preferably, the flange of the axial tube includes an inclined guiding face for guiding the coupling portion of the positioning member to engage with the flange of the axial tube.

Preferably, a protrusion extends from a top portion of the positioning member and has an end edge close to an inner face of a rotor.

In accordance with another aspect of the present invention, a bearing positioning structure for a motor comprises an axial tube, a stator, and a positioning member. A bearing is received in the axial tube. The stator includes a first coupling section. The positioning member includes a pressing portion and a coupling portion. The first coupling section of the stator is engaged with the coupling portion of the positioning member for securely mounting the positioning member to an end of the axial tube, with the pressing portion of the positioning member pressing against the bearing to position the bearing in the axial tube.

Preferably, the coupling portion is formed on a top portion of the positioning member.

Preferably, the positioning member includes a top portion, and the pressing portion extends axially from an underside of the top portion.

Preferably, the coupling portion of the positioning member is a hook or an engaging groove.

Preferably, a restraining member is mounted in the axial tube for limiting axial movement of a shaft of a rotor.

Preferably, a protrusion extends from a top portion of the positioning member and has an end edge close to an inner face of a rotor.

Preferably, the stator further includes a second coupling section, and the axial tube includes an engaging portion for engaging with the second coupling section of the stator, thereby securely mounting the stator to the axial tube.

Preferably, the first coupling section is a hook.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
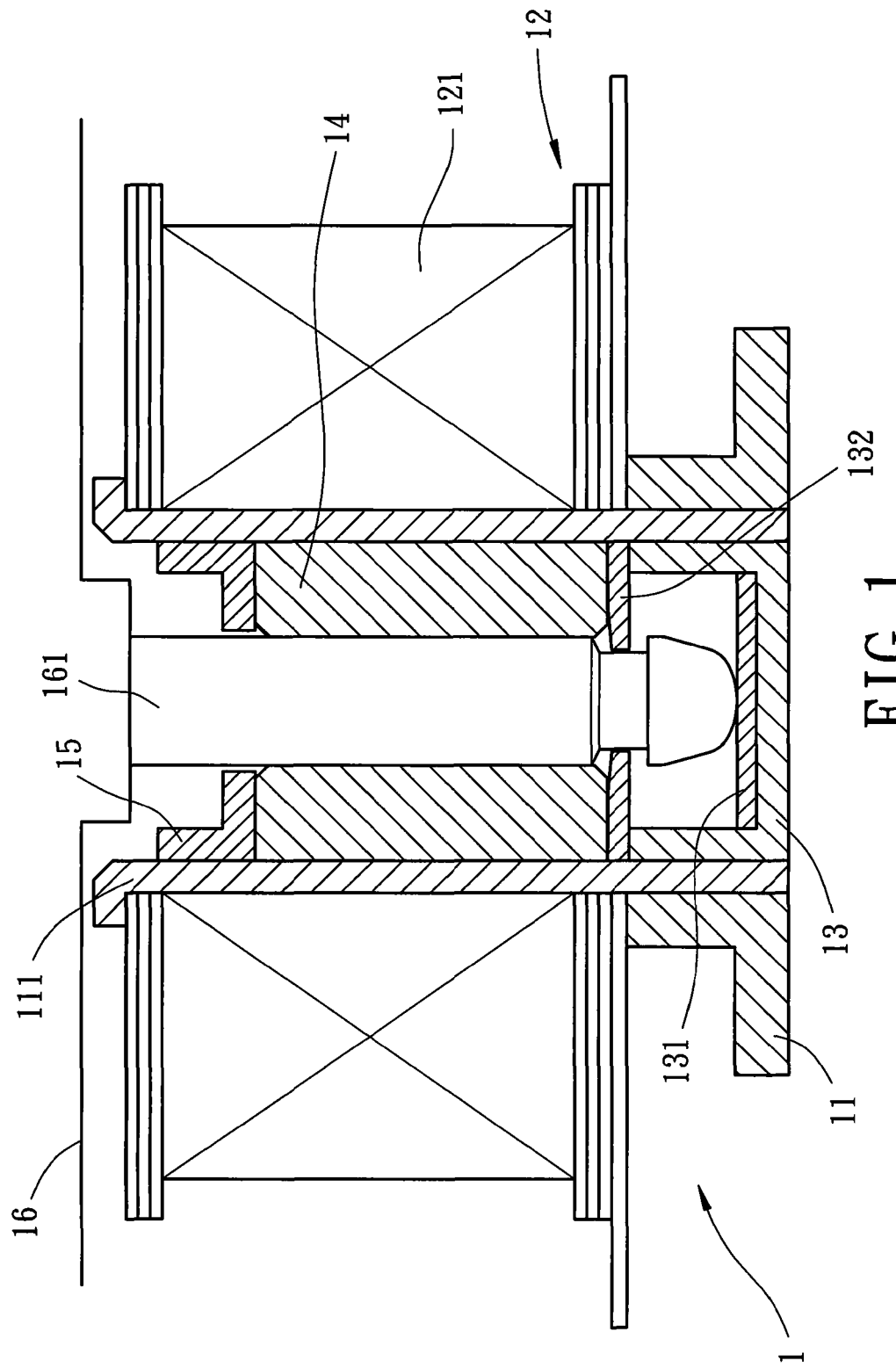
FIG. 1 is a sectional view of a conventional bearing positioning structure of a motor.
Figure 2:
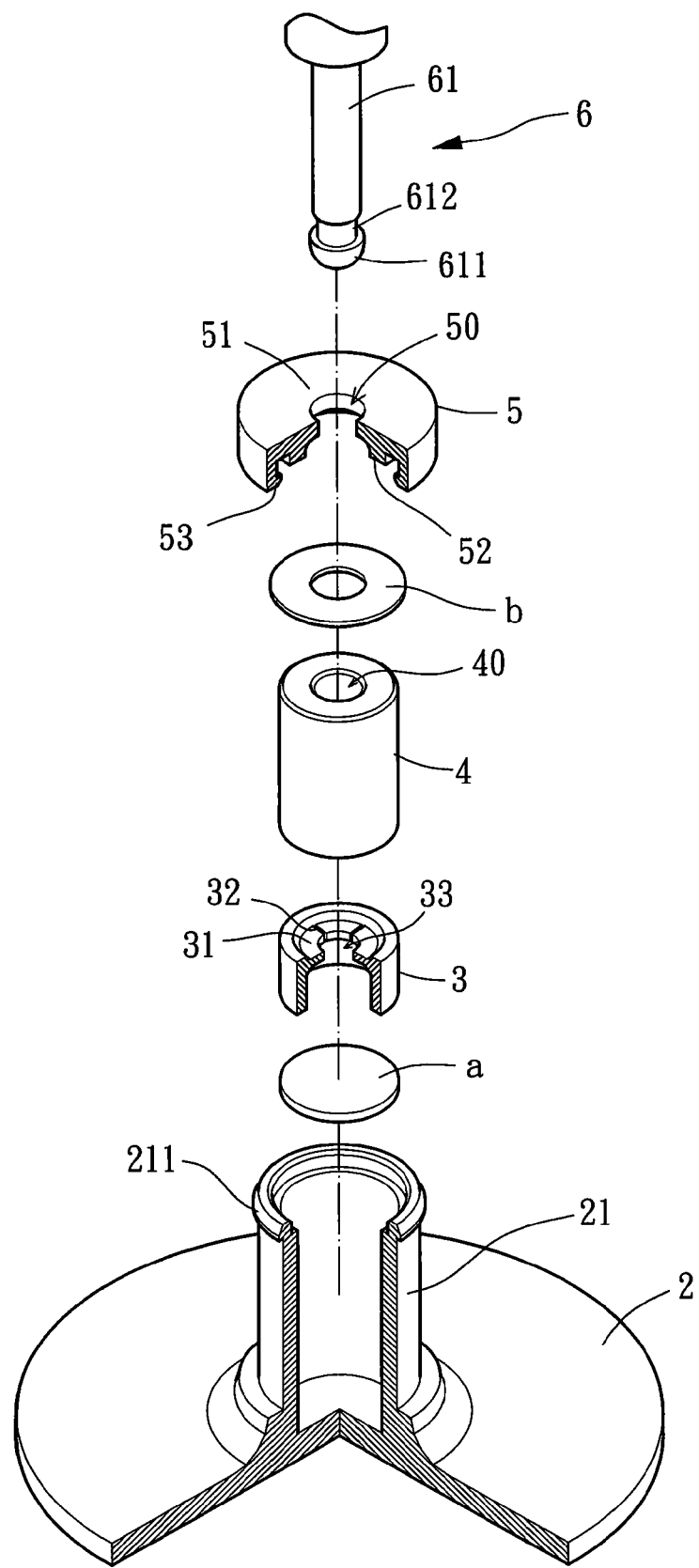
FIG. 2 is an exploded perspective view, party cutaway, of a first embodiment of a bearing positioning structure in accordance with the present invention.
Figure 3:
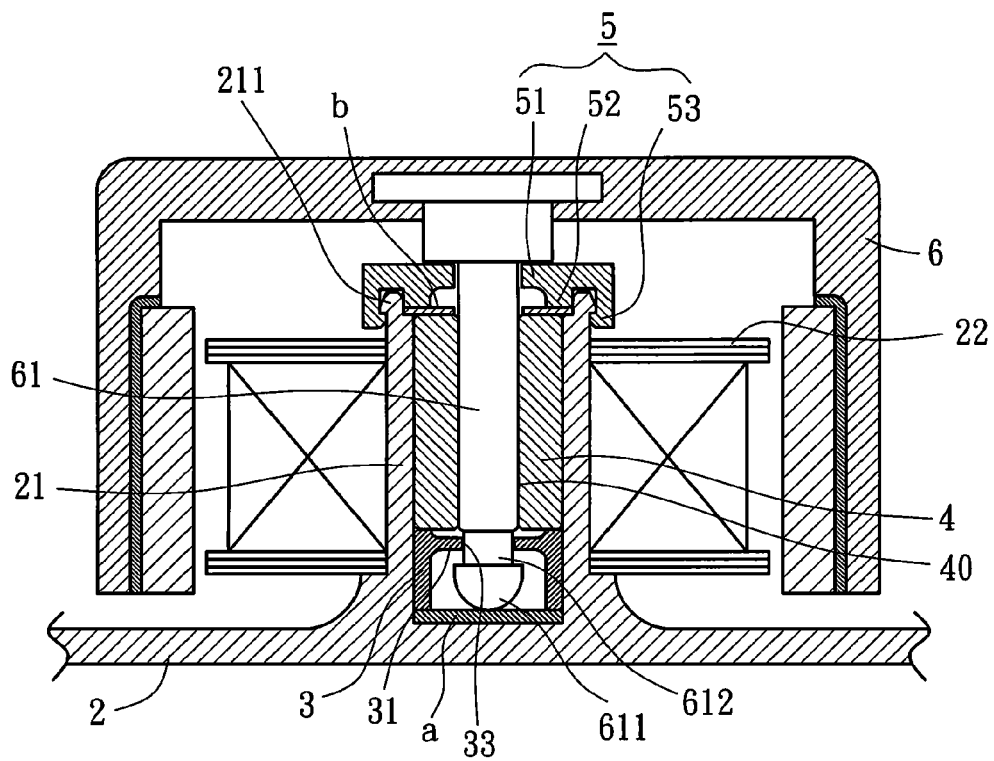
FIG. 3 is a sectional view of the first embodiment of the bearing positioning structure in accordance with the present invention.

Referring to FIGS. 2 and 3, a first embodiment of a bearing positioning structure in accordance with the present invention comprises a base 2, a restraining member 3, a bearing 4, a positioning member 5, and a rotor 6. Mounted to the base 2 is an axial tube 21 and a stator 22, wherein the axial tube 21 may be assembled to or integrally formed with the base 2 for receiving motor elements including the restraining member 3, the bearing 4, and the positioning member 5. The stator 22 may be of radial winding type or axial winding type. The restraining member 3 restrains axial movement of a shaft 61 of the rotor 6 relative to the axial tube 21. The bearing 4 may be an oily bearing, a ball bearing, a fluid dynamic bearing, etc. The shaft 61 is rotatably extended through the bearing 4. The positioning member 5 is engaged with the axial tube 21 for reliably positioning the bearing 4 in the axial tube 21.

Still referring to FIGS. 2 and 3, the axial tube 21 of the first embodiment in accordance with the present invention includes a coupling section 211 that extends radially and annularly on an end edge of the axial tube 21. Preferably, the coupling section 211 is a flange and includes an inclined guiding face (not labeled) for guiding the positioning member 5 to a position securely engaged with the coupling section 211.

Still referring to FIGS. 2 and 3, the restraining member 3 of the first embodiment in accordance with the present invention includes a plurality of protrusions 31, a plurality of slits 32, and a through-hole 33. The protrusions 31 extend radially inward form an inner circumference of the restraining member 3 for restraining axial movement of the shaft 61, with a slit 32 formed between a pair of protrusions 31 adjacent to each other to providing the protrusions 31 with improved deforming capacity. The through-hole 33 is defined by the protrusions 31 and in a center of the restraining member 3, with the shaft 61 extending through the through-hole 33 of the restraining member 3.

Still referring to FIGS. 2 and 3, the positioning member 5 of the first embodiment in accordance with the present invention is preferably a ring and includes a through-hole 50, a top portion 51, a pressing portion 52, and a coupling portion 53. The through-hole 50 is defined in a center of the positioning member 5, allowing the shaft 61 to extend therethrough. The pressing portion 52 extends axially from an underside of the top portion 51 for pressing against the bearing 4, thereby positioning the bearing 4 in the axial tube 21. The coupling portion 53 may be a hook or an engaging groove. In this example, the coupling portion 53 is a hook formed on a bottom of the positioning member 5 for engaging with the coupling section 211 of the axial tube 21.

Still referring to FIGS. 2 and 3, in assembly of the motor of the first embodiment in accordance with the present invention, the restraining member 3 is placed into the axial tube 21, with an abrasion-resistant member "a" sandwiched between the restraining member 3 and the bottom end of the axial tube 21 for preventing damage to the base 2 due to friction resulting from rotation of the shaft 61 of the rotor 6. Then, the bearing 4 is mounted into the axial tube 21, with an end face of the bearing 4 abutting against the top of the restraining member 3. The positioning member 5 is then mounted to the axial tube 21 by moving the coupling portion 53 of the positioning member 5 along the inclined guiding face of the coupling section 211. Hence, the positioning member 5 is reliably coupled to the upper end of the axial tube 21, with the pressing portion 52 of the positioning member 5 pressing against the other end face of the bearing 4. Hence, the bearing 4 is reliably fixed in the axial tube 21. Preferably, at least one washer "b" is mounted between the other end face of the bearing 4 and the pressing portion 52. Preferably, the washer "b" is a resilient washer or abrasion-resistant washer.

Still referring to FIGS. 2 and 3, the shaft 61 is extended through an axial hole formed by the through-hole 50 of the positioning member 5, the through-hole (not labeled) of the washer "b", and the through-holes 40 and 33 of the bearing 4 and the restraining member 3. Since the diameter of the through-hole 33 of the restraining member 3 is slightly smaller than the diameter of an end 611 of the shaft 61, a force is applied to forcibly pass the end 611 of the shaft 61 through the through-hole 33 that expands due to deformation of the protrusions 31. After the end 611 of the shaft 61 passes through the through-hole 33 and a necked portion 612 reaches the through-hole 33, the protrusions 31 return to their original position and engage with the necked portion 612, thereby limiting axial movement of the shaft 61 relative to the axial tube 21.

Still referring to FIGS. 2 and 3, the shaft 61 rotates in the axial hole formed by the restraining member 3, the bearing 4 and the positioning member 5 when the rotor 6 turns. Since the pressing portion 52 of the positioning member 5 presses against an end face of the bearing 4 and since the coupling portion 53 of the positioning member 5 reliably engages with the coupling section 211 of the axial tube 21, the bearing 4 is reliably fixed in the axial tube 21 without the risk of loosening, thereby enhancing assembling reliability of the motor elements and prolonging the life of the motor.

Figure 4:
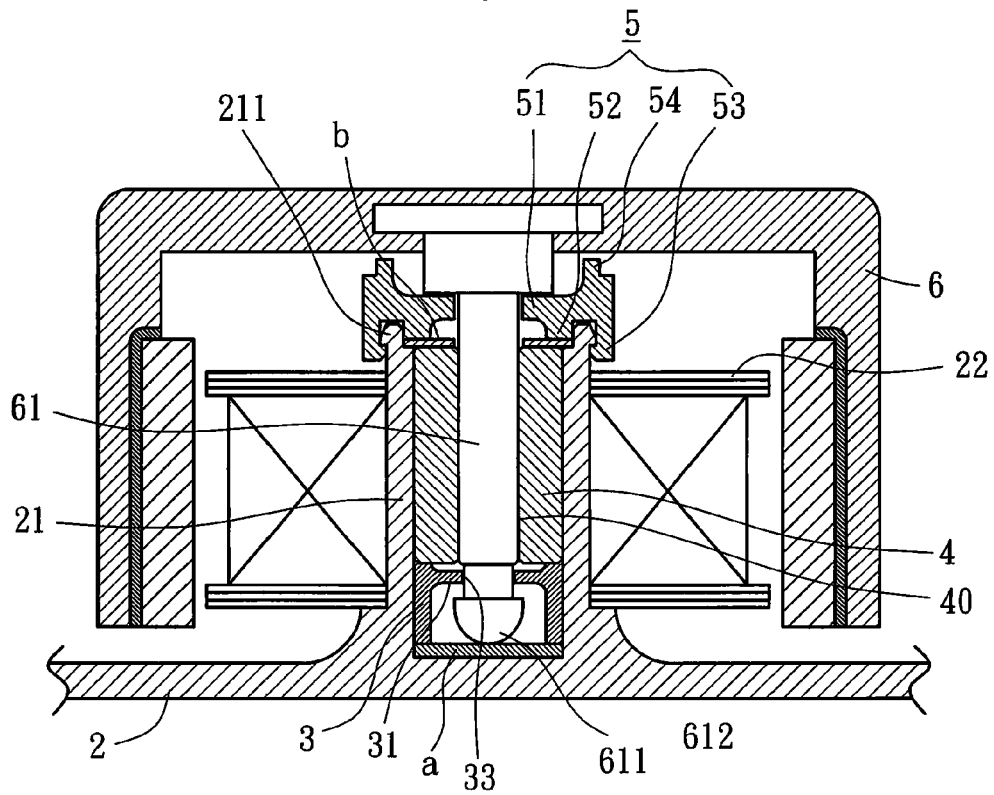
FIG. 4 is a sectional view similar to FIG. 3, illustrating a second embodiment of the bearing positioning structure in accordance with the present invention.

FIG. 4 illustrates a second embodiment of the bearing positioning structure for a motor in accordance with the present invention. As compared to the first embodiment, the positioning member 5 of the second embodiment further includes a protrusion 54 that extends axially from an outer face of the top portion 51 of the positioning member 5. Preferably, an end edge of the protrusion 54 is close to an inner side of the rotor 6. This avoids dusts or impurities from entering the gap between the shaft 61 and the bearing 4 due to air currents resulting from rotation of the rotor 6. Thus, non-smooth operation of the rotor 6 and damage to the bearing 4 or other elements are avoided. The life of the motor is prolonged accordingly.

Figure 5:
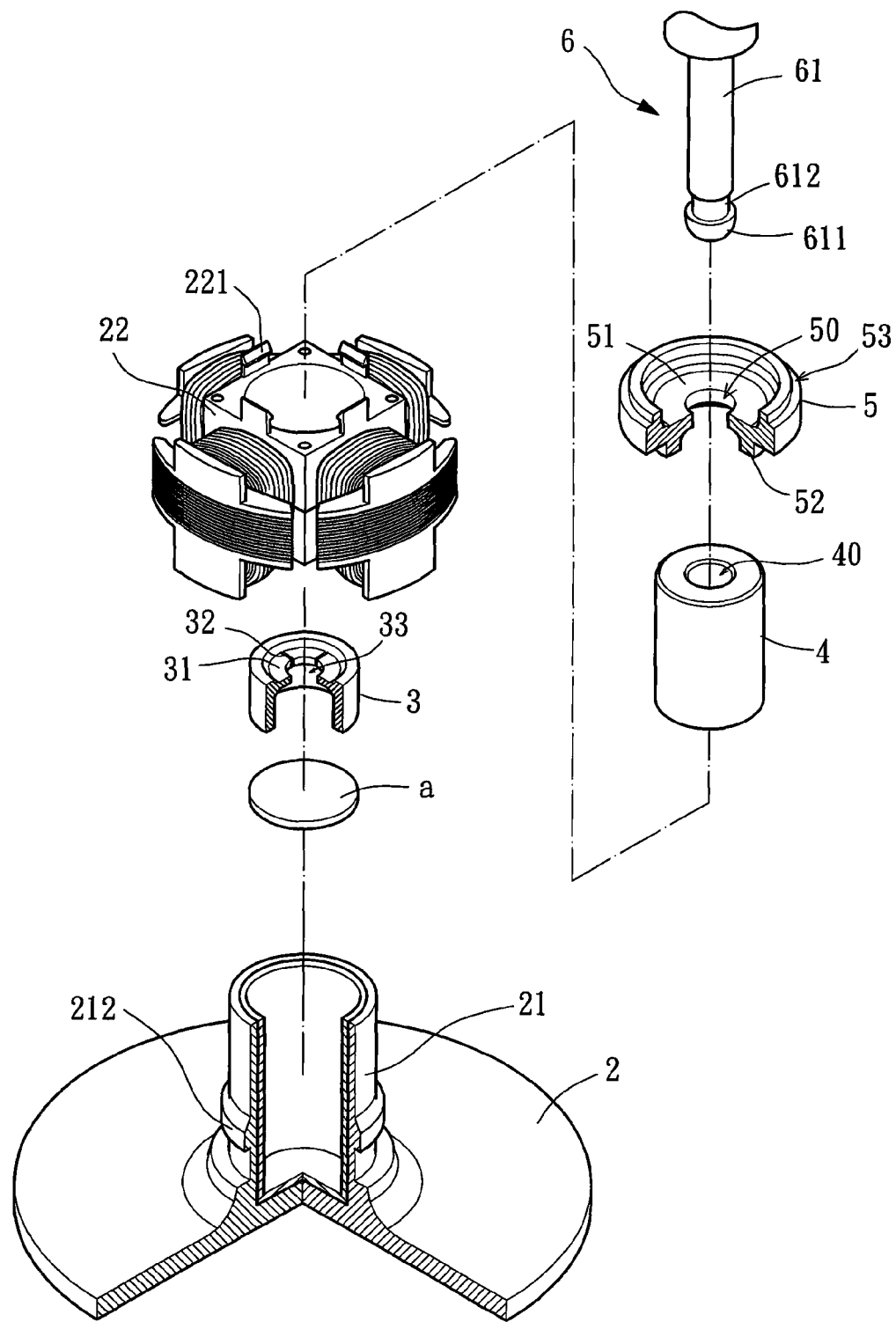
FIG. 5 is an exploded perspective view, party cutaway, of a third embodiment of the bearing positioning structure in accordance with the present invention.
Figure 6:
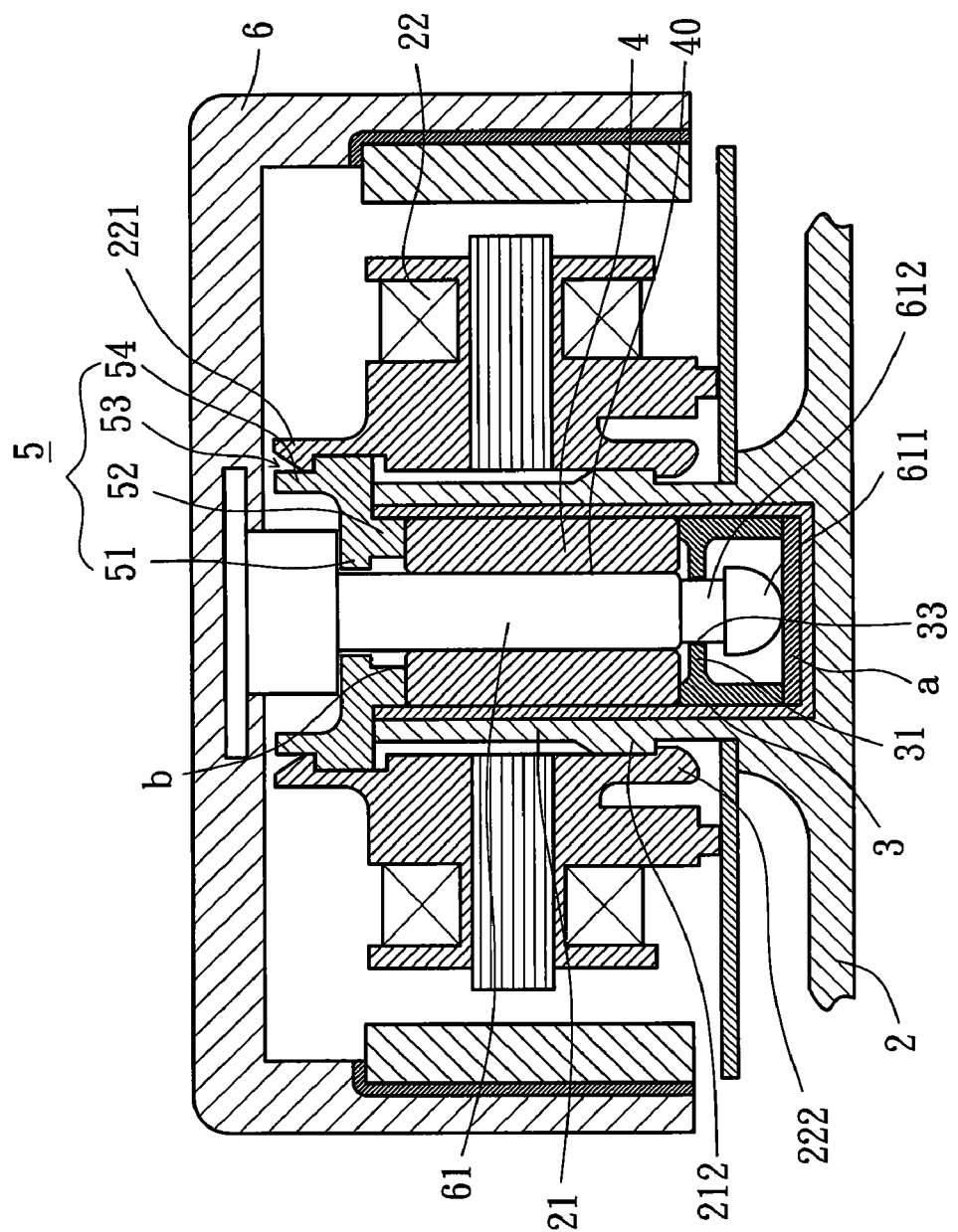
FIG. 6 is sectional view of the third embodiment of the bearing positioning structure in accordance with the present invention.

FIGS. 5 and 6 illustrate a third embodiment of the bearing positioning structure for a motor in accordance with the present invention. As compared to the second embodiment, the stator 22 of the third embodiment includes a first coupling section 221 on top of the stator 22 for engaging with the coupling portion 53 of the positioning member 5. Hence, the positioning member 5 is reliably mounted to the end of the axial tube 21 through the stator 22. Preferably, the coupling portion 53 is an engaging groove for engaging with the first coupling section 221. Preferably, the coupling portion 53 is annularly formed along a circumference of the top portion 51 of the positioning member 5.

Still referring to FIGS. 5 and 6, the stator 22 of the third embodiment is engaged with the axial tube 21 by providing a second coupling section 222 on a bottom portion of the stator 22 for engaging with an engaging portion 212 of the axial tube 21. Hence, the stator 22 is reliably fixed to the axial tube 21. Preferably, the engaging portion 212 is formed on an outer circumference of the axial tube 21 and corresponding to the second coupling section 222. Preferably, the first and second coupling sections 221 and 222 are hooks.

Still referring to FIGS. 5 and 6, in assembly of the motor elements of the third embodiment, the restraining member 3, the bearing 4, and the positioning member 5 are mounted into the axial tube 21 in sequence. Next, the first coupling section 221 and the second coupling section 222 of the stator 22 are respectively engaged with the coupling portion 53 of the positioning member 5 and the engaging portion 212 of the axial tube 21 such that the stator 22 is reliably fixed to the axial tube 21, with the pressing portion 52 tightly pressing against an end face of the bearing 4. The assembling reliably is enhanced and the life of the motor is prolonged through engagement between the stator 22 and the positioning member 5 that allows the positioning member 5 to be reliably fixed to an end of the axial tube 21.

As mentioned above, in the conventional bearing positioning structure has the drawback of easy deformation in the axial tube 111 due to heat expansion and cold shrinkage as well as stress generated during operation of the motor such that the supporting member 13 and the positioning member 15 cannot be fixed in the axial tube 111, leading to unreliable positioning of the bearing 14. Namely, the bearing 14 is liable to move in the axial tube 111.

In the present invention, the above drawback is eliminated by providing a positioning member 5 including a pressing portion 52 and a coupling portion 53, wherein the coupling portion 53 engages with a coupling section 211 on the axial tube 21 or a first coupling portion 221 on the stator 22 and wherein the pressing portion 52 presses against the bearing 4 to position the bearing 4 in the axial tube 21. The positioning member 5 may further include a protrusion 54 extending upward from the top portion 51 to prevent dusts or impurities from entering the gap between the shaft 61 and the bearing 4. The assembling reliability is enhanced and the life of the motor is prolonged.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A bearing positioning structure for a motor, comprising:
an axial tube for receiving a bearing;
a stator including a first coupling section; and
a positioning member including a pressing portion and a coupling portion, with the coupling portion of the positioning member being a hook or an engaging groove;
wherein the first coupling section of the stator is engaged with the coupling portion of the positioning member for securely mounting the positioning member to an end of the axial tube, with the pressing portion of the positioning member pressing against the bearing to position the bearing in the axial tube.

2. The bearing positioning structure for a motor as claimed in claim 1, wherein the coupling portion is formed on a top portion of the positioning member.

3. The bearing positioning structure for a motor as claimed in claim 1, wherein the positioning member includes a top portion and wherein the pressing portion extends axially from an underside of the top portion.

4. The bearing positioning structure for a motor as claimed in claim 1 further comprising a restraining member mounted in the axial tube for limiting axial movement of a shaft of a rotor.

5. The bearing positioning structure for a motor as claimed in claim 1 further comprising a protrusion extending from a top portion of the positioning member, with the protrusion having an end edge close to an inner face of a rotor.

6. The bearing positioning structure for a motor as claimed in claim 1, wherein the stator further includes a second coupling section and wherein the axial tube includes an engaging portion for engaging with the second coupling section of the stator, thereby securely mounting the stator to the axial tube.

7. The bearing positioning structure for a motor as claimed in claim 1, wherein the first coupling section is a hook.

* * * * *